March 5, 1968　　W. C. PARKMAN　　3,371,830
FISH STRINGING DEVICE
Filed May 24, 1967
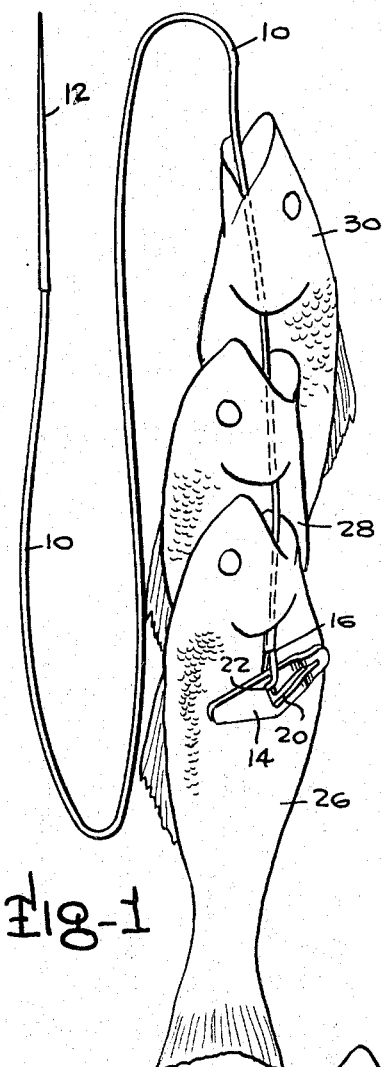
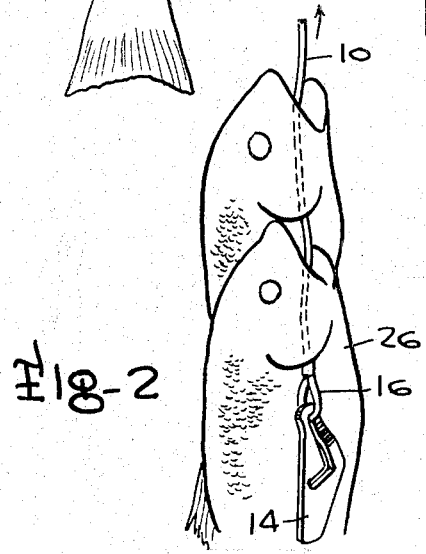
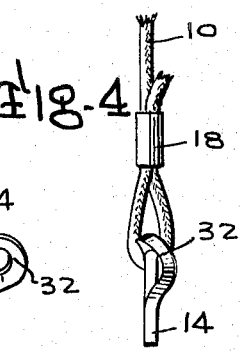
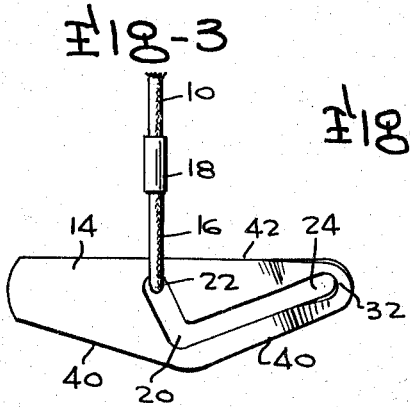
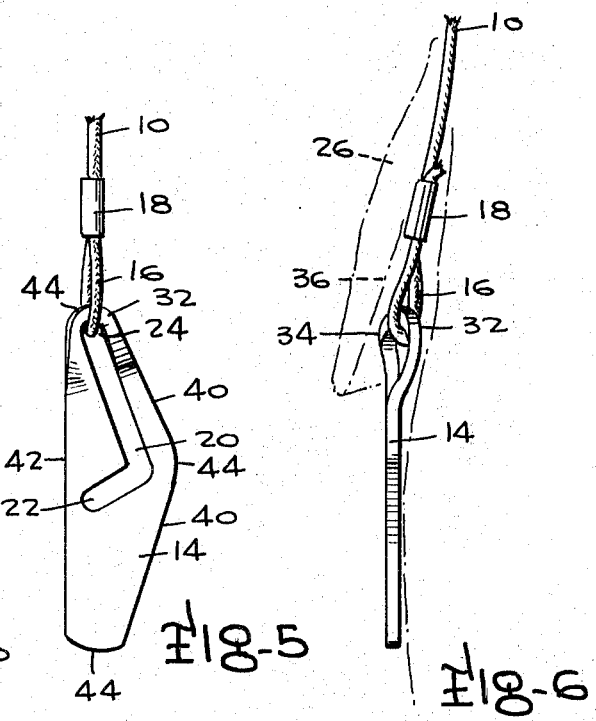
INVENTOR
WILLIAM C. PARKMAN
BY Mason, Fenwick & Lawrence
ATTORNEYS

United States Patent Office 3,371,830
Patented Mar. 5, 1968

3,371,830
FISH STRINGING DEVICE
William C. Parkman, 123 W. Hunter St.
Lakeland, Fla. 33803
Filed May 24, 1967, Ser. No. 641,003
10 Claims. (Cl. 224—7)

ABSTRACT OF THE DISCLOSURE

A fish stringer having a fish retainer plate attached to the end of a stringer cord slidable in a slot in the plate to an end portion of the plate to enable removal of the plate through the gills of a fish on the cord.

Background of the invention

Fish stringers for retaining freshly caught fish have been employed by anglers since before the time of recorded history. Such stringers normally consist of a cord having a fish-threading needle attached to one end and an elongated fish retainer means attached to the other end of the cord to prevent fish from slipping from the cord. Such devices are used by initially passing the fish-threading needle through the gills and out of the mouth of a fish in a tail to head direction. The fish is then moved to the other end of the cord where the elongated fish retainer means assumes a position substantially normal to the cord and against the body of the fish so as to preclude passage of a retainer means through the gills of the fish. Fish that are subsequently caught are threaded onto the cord and are prevented from sliding free of the cord by the previously threaded fish.

Most of the prior art devices are constructed so that it is impossible to remove fish from the stringer by passing the fish retaining means through the gills and out of the mouth of the lowermost fish on the cord. Consequently, it is necessary to remove the fish in reverse order from the order in which they were placed on the stringer. The anatomy of fish is such that it is impossible to drop the fish off a loaded stringer by merely holding the fish retaining end means and relying on gravity to cause the fish to fall from the fish-threader end of the cord. This is true because each fish tends to orient itself in a tail-down position so as to form a Z-shaped bend in the cord which precludes movement of the fish down the cord toward the threading end. Consequently, it is necessary that each fish be manually moved along the length of the cord to the threading end for removal.

The problem of removing fish from a stringer has long been recognized by those skilled in the art. Consequently, numerous attempts have been made to provide structures which would enable the removal of the fish from the fish-retainer end of the cord. The desirability of removing fish from this end is obvious by virtue of the fact that the fish do not bend the cord when the cord is held by its threading end and the fish will easily slide along the cord. The prior art attempts to provide a solution to the problem of fish removal from a stringer have resulted in a number of devices wherein the fish retainer means on the end of the cord is removably attached to the cord. Such devices, while admittingly enabling the removal of fish from the retainer end of the cord, have proven to be somewhat complex and expensive to construct. Others have proven to be somewhat unreliable in that they occasionally release fish at undesirable times. A few of the prior art devices are constructed so as to enable manipulation of the cord in the fish retainer means so that the fish retainer means can pass through the gills and the mouth of a fish in order to enable removal of the lowermost fish from the stringer in the successive order in which the fish were placed on the stringer. However, such last mentioned means have not functioned in an optimum manner in that the fish retainer means previously employed has been in the form of a round tube-like means such as the means illustrated in U.S. Patent No. 1,176,177. The round shape of such devices does not enable the easy passage of such through the gills of a fish since the gills are flat and fairly closely spaced. Such devices are also fairly complex and require substantial manufacturing effort which consequently increases their cost.

Summary of the invention

It is, therefore, the primary object of this invention to provide a new and improved fish stringer of economical design which will enable the easy removal of fish from the stringer in the order in which they were placed on the stringer and will preclude involuntary removal of the fish from the stringer.

The desired object of this invention is achieved by the provision of a fish stringing cord having a fish-threading needle on one end thereof and a substantially flat elongated fish retainer plate on the other end thereof. Attachment of the cord to the elongated fish retainer plate is enabled by a loop on the cord which is passed through an L-shaped slot formed in the elongated fish retainer plate. One end of the L-shaped slot is substantially adjacent the middle of the elongated fish retainer plate and when the loop is in this end of the slot, the fish retainer plate assumes a position substantially normal to the cord so as to prevent the removal of fish from the cord; this result is achieved because the elongated fish retainer plate is longer than the width of the gills of a fish and cannot pass therethrough. However, the other end of the L-shaped slot is located adjacent one end of the fish retainer plate and movement of the loop to this end of the slot causes the elongated plate to orient its major longitudinal axis substantially parallel to the axis of the cord to enable passage of the retainer plate and the cord through the gills of the lowermost fish on the cord.

Another feature of the invention resides in the provision of a twisted end portion on the elongated fish retainer plate in which twisted end portion in the last mentioned end of the slot is located. The twisted end portion serves the dual purpose of allowing the loop and the main body portion of the retainer plate to become substantially coplanar to present a minimum cross section for passage through the gills of the fish. As was noted previously, the gills of the fish are substantially planar and are fairly closely spaced; consequently, the flat fish retainer plate can easily pass through the gills when the loop is in the twisted end portion.

Another advantage of the twisted end portion of the fish retainer plate is that one edge of the twisted end portion engages the inside of the gill to smoothly and efficiently guide the fish retainer plate into the interior of the gill for passage therethrough.

Brief description of the drawings

FIGURE 1 is a perspective view of the preferred fish stringer embodiment of this invention illustrating such in use with fish strung thereon;

FIGURE 2 is a perspective view of the preferred embodiment illustrating the manner in which fish are removed from the stringer;

FIGURE 3 is an elevational view of the lower end of the preferred embodiment showing the parts thereof in position for retaining fish thereon;

FIGURE 4 is a side elevational view of the parts illustrated in FIGURE 3;

FIGURE 5 is a front elevational view of the lower end of the preferred embodiment showing the parts thereof in a second relative position for enabling the removal of fish therefrom; and FIGURE 6 is a side elevational view of the parts oriented in the same manner as in FIGURE 5 and showing initial position of the elements as they enter the gills of a fish for removal of the fish from the stringer.

*Brief description of the preferred embodiment*

A preferred embodiment of this invention is shown in use in FIGURE 1 and comprises a flexible fish threading cord 10 having a fish-threading needle 12 attached to one end and an elongated metallic or other material fish retainer plate 14 attached to the other end thereof. Plate 14 is attached to a terminal loop 16 formed in the end of cord 10 and which loop is maintained by a metallic clip or other suitable means 18. Loop 16 is freely slidable in an L-shaped slot 20 formed in plate 14. Slot 20 is formed with first and second legs as best illustrated in FIGURE 3 and has a first end 22 and a second end 24.

When loop 16 is positioned in end 22, plate 14 and cord 10 assume the position illustrated in FIGURE 3 wherein the long axis of plate 14 is essentially normal to the axis of cord 10 as shown. In this position, plate 14 serves to retain fish upon cord 10 in the manner illustrated in FIGURE 1. In operation, plate 14 is positioned as shown in FIGURE 3 and fish-threading needle 12 is passed through the gills and mouth of a fish in a tail to mouth direction. Movement of the cord is continued until the plate 14 abuts against the exterior of the gills of the fish to preclude any further threading movement of cord 10 through the fish. Since plate 14 is longer than the gill opening of the fish, it cannot pass through the gills while loop 16 is positioned in end 22 of slot 20 as shown in FIGURES 1 and 3. The lowermost fish 26 on the stringer serves to retain subsequently added fish 28 and 30 in an obvious manner. When it is desired to remove the fish, plate 14 is oriented so that it assumes the position illustrated in FIGURES 2 and 5 wherein the loop 16 is in end 24 of the plate. End 24 of slot 20 is located in a twisted end portion 32 of plate 14. The lowermost fish 26 is removed from stringer cord 10 by moving the cord in a direction of the arrow illustrated in FIGURE 2 or by merely holding the cord stationary while allowing gravity to pull the fish therefrom. The twisted end portion 32 serves dual purposes in enabling the easy removal of the lowermost fish from cord 10. Firstly, as best illustrated in FIGURE 6, the outer edge portion 34 of the twisted end portion is engaged by the gill cover plate 36 of the lowermost fish 26 to guide the plate 14 into the interior of the fish. Secondly, and even more significantly, the twisted end portion enables the loop 16 to assume a position substantially coplanar with the main portion of plate 14 so as to provide a low cross-sectional area for passage through the fish gills. If it were not for the twisted end portion, the plane of loop 16 would be substantially perpendicular to the plane of the main portion of plate 14 so as to create a much larger cross-sectional area to pass through the fish.

Plate 14 is formed in the shape of a triangle having substantially equal length edges 40 and a long edge 42 with the edges being connected by rounded corners 44 as illustrated in FIGURES 3 and 5. End 22 of slot 20 is substantially adjacent the middle of edge 42 and the intersection of the two legs of the L-forming slot 20 is substantially adjacent the intersection of the two equal length edges 40.

Positioning of loop 16 in end 22 is easily accomplished and the loop will remain in the position illustrated in FIGURE 3 without any chance of moving therefrom so as to prevent the possibility of the lowermost fish 26 escaping or falling from cord 10. However, loop 16 is easily movable to end 24 when it is desired to remove the fish from the cord.

It is, therefore, obvious that the instant invention provides a highly useful, yet simple, device which meets a long felt need. Only a preferred embodiment has been illustrated and it should be clearly understood that other obvious modifications will be conceived by those skilled in the art but which will not depart from the spirit and scope of the invention as set forth in the appended claims. It should therefore be understood that the scope of this invention is limited solely by the claims.

I claim:

1. A fish stringer comprising a flexible cord passable through a fish's gills; a loop on one end of said cord; and an elongated fish retainer means including a generally planar body portion and having an end portion twisted with respect to said body portion and a slot having a first end formed in a central portion of said body portion and a second end formed in said end portion with said loop extending through said slot so as to be positionable in said first end of said slot wherein said elongated fish retainer means assumes a position substantially normal to the axis of said cord to retain fish on said cord and also positionable in said second end of said slot wherein said elongated fish retainer means assumes a generally aligned position with respect to said cord and said body portion and the plane of said loop assume positions in substantially coplanar alignment with each other to enable the passage of said loop and said fish retainer through a fish's gills to enable removal of the lowermost fish from said cord.

2. The device of claim 1 wherein said fish retainer means is a metal plate.

3. The device of claim 2 additionally including a fish threading needle means on the other end of said cord.

4. The device of claim 1 wherein said slot is L-shaped.

5. A fish stringer comprising a substantially flat elongated fish retainer plate having a slot within the confines of its periphery; a loop on the end of a fish stringing cord passing through said slot and movable in said slot between first and second respective positions on respective first and second ends of said slot; a twisted end portion formed in one end of said fish retainer plate and having said second end of said slot formed therein whereby the positioning of said loop in said second end of slot enables said loop and said fish retainer plate to assume a substantially coplanar position offering a minimum resistance to passage of said fish retainer plate and said loop through the gills of a fish on said fish stringing cord to enable easy removal of fish from said cord.

6. The device of claim 5 wherein said slot is L-shaped.

7. The device of claim 6 wherein said fish retainer plate is formed of metal.

8. The device of claim 6 wherein said fish retainer plate is in the general form of an elongated triangle having rounded corners.

9. The device of claim 8 wherein said fish retainer plate is in the form of an elongated triangle having first and second sides that are of substantially equal length and a third side of longer length.

10. The device of claim 9 wherein said L-shaped slot is formed of first and second legs which intersect at a point adjacent the intersection of said sides of substantially equal length and wherein said first end of said slot is located substantially adjacent the middle of said third side and said second end of said slot is adjacent the intersection of one of said sides of substantially equal length and said third side of longer length.

References Cited

UNITED STATES PATENTS 2,514,483    7/1950    Felton et al. _____ 224—7
2,734,671    2/1956    Adams _____ 224—7

ROBERT G. SHERIDAN, *Primary Examiner.*